Dec. 9, 1930.                J. P. SEAHOLM                1,784,499
                              CULTIVATOR
                     Original Filed Oct. 5, 1925    4 Sheets-Sheet 1

Inventor
John P. Seaholm
By: J. C. Shonts   Atty.

Dec. 9, 1930.  J. P. SEAHOLM  1,784,499
CULTIVATOR
Original Filed Oct. 5, 1925    4 Sheets-Sheet 2

Inventor:
John P. Seaholm
By: L.C. Shorts   Atty

Dec. 9, 1930.   J. P. SEAHOLM   1,784,499
CULTIVATOR
Original Filed Oct. 5, 1925   4 Sheets-Sheet 3

Inventor:
John P. Seaholm
By: L. C. Shonts   Atty:-

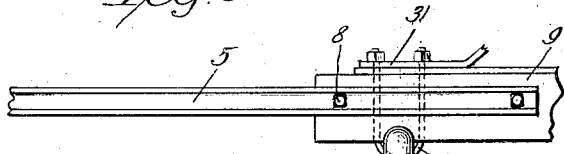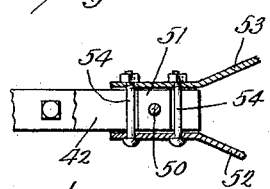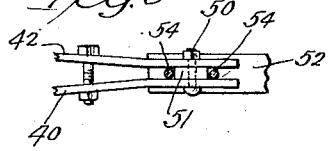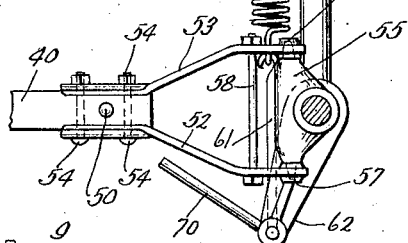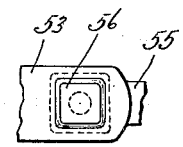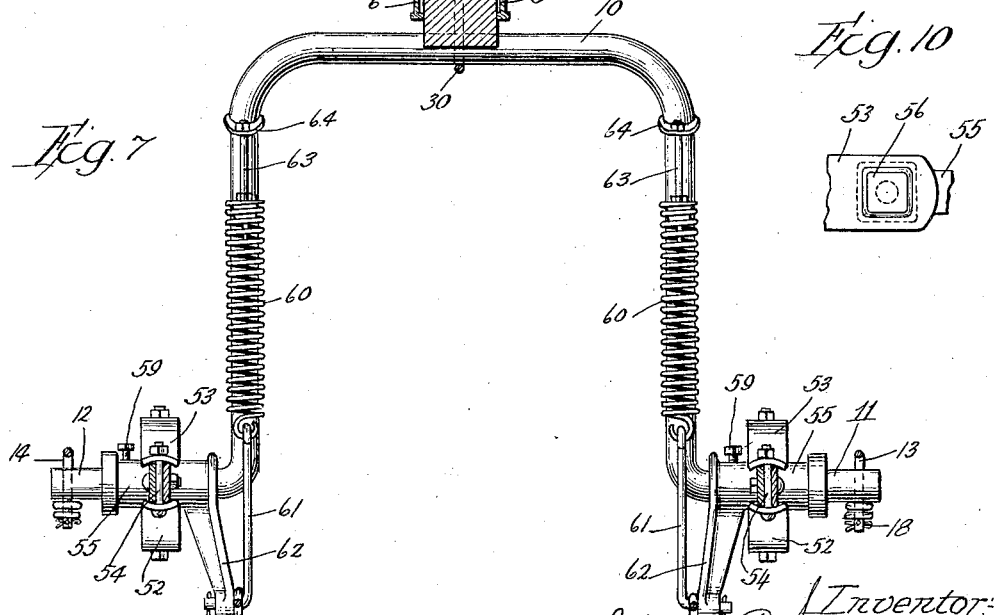

Patented Dec. 9, 1930

1,784,499

UNITED STATES PATENT OFFICE

JOHN P. SEAHOLM, OF MOLINE, ILLINOIS, ASSIGNOR, BY MESNE ASSIGNMENTS, TO MINNEAPOLIS-MOLINE POWER IMPLEMENT COMPANY, OF MINNEAPOLIS, MINNESOTA, A CORPORATION OF DELAWARE

CULTIVATOR

Original application filed October 5, 1925, Serial No. 60,374, Patent No. 1,607,646, dated November 23, 1926. Divided and this application filed March 12, 1926. Serial No. 94,112.

The invention relates to a cultivator.

It relates particularly to a corn cultivator and in order that its import and purpose may be clearly understood it is necessary to refer briefly to the cultivator art.

The early cultivators drawn by animals were walking cultivators—that is, the operator walked behind the cultivator while it was being pulled through a field by animals. This type of cultivator was quite satisfactory from the standpoint of the facility with which the operator could manipulate the shovels. He manipulated them directly by hand, he was behind the shovels where he could easily watch their work and dodge them about the plants being cultivated, and the shovels were sufficiently far behind the wheels to permit them to be moved freely to one side or the other without interference from the wheels.

The art soon progressed to riding cultivators in which the operator is seated on the cultivator while it is being drawn through the field. The introduction of riding cultivators caused numerous problems. Provision had to be made for taking care of operators of different weights. Some means had to be provided for balancing the cultivators and some method of guiding the cultivators or the shovels had to be devised. Various different types of riding cultivators were developed such as wheel guide cultivators, hammock seat cultivators, wiggle-tail cultivators, automatic balancing cultivators, etc., all of which were more or less elaborate and complicated. These cultivators were usually sold over a wide territory and it was and still is considered necessary to have them capable of operation under a wide variety of conditions. For example, a riding cultivator is used in one part of the country for cultivating corn, in another part for cultivating cotton, and in another part for cultivating potatoes. In addition to the variety of crops the method of cultivating may be different in different parts of the country and the soil as well as the contour of the country may be different, all of which factors must be taken into account in building the cultivator. The result is that these riding cultivators are relatively complicated and expensive, and they get loose and unsatisfactory after they have been used for some time.

The present invention has been devised with the object in view of providing a riding, corn cultivator that is more simple than any heretofore made; one that is extremely light in weight, and in draft; one made of a minimum number of parts; one made of parts that can be easily formed out of inexpensive, relatively light material by simple manufacturing processes, and yet one which will meet all the necessary requirements of a good riding corn cultivator.

These results are achieved by a simplified combination of elements in which the parts are chosen, constructed, and related so that a maximum number of functions is secured with a minimum of elements.

Other objects and advantages of the invention will hereinafter appear.

An embodiment of the invention is illustrated in the drawing in which:

Figure 6 is a detail side elevation showing the connection of the drag bar to the cultivator arch.

Figure 7 is a detail elevation of the cultivator arch and drag bar connection, showing some of the parts in cross-section, and looking forward from the rear of the cultivator.

Figure 8 is a sectional view through the drag bar connection.

Figure 9 is a detail plan view of the drag bar connection.

Figure 10 is a detail plan view of the pivotal connection of the drag bars.

Figure 1:
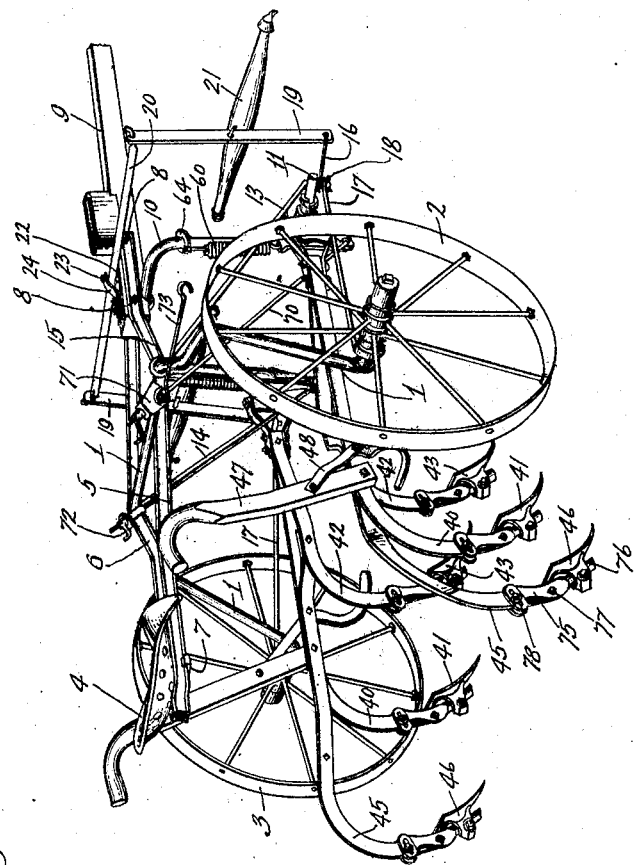
Figure 1 is a perspective view of the cultivator with the shovels in working position.
Figure 2:
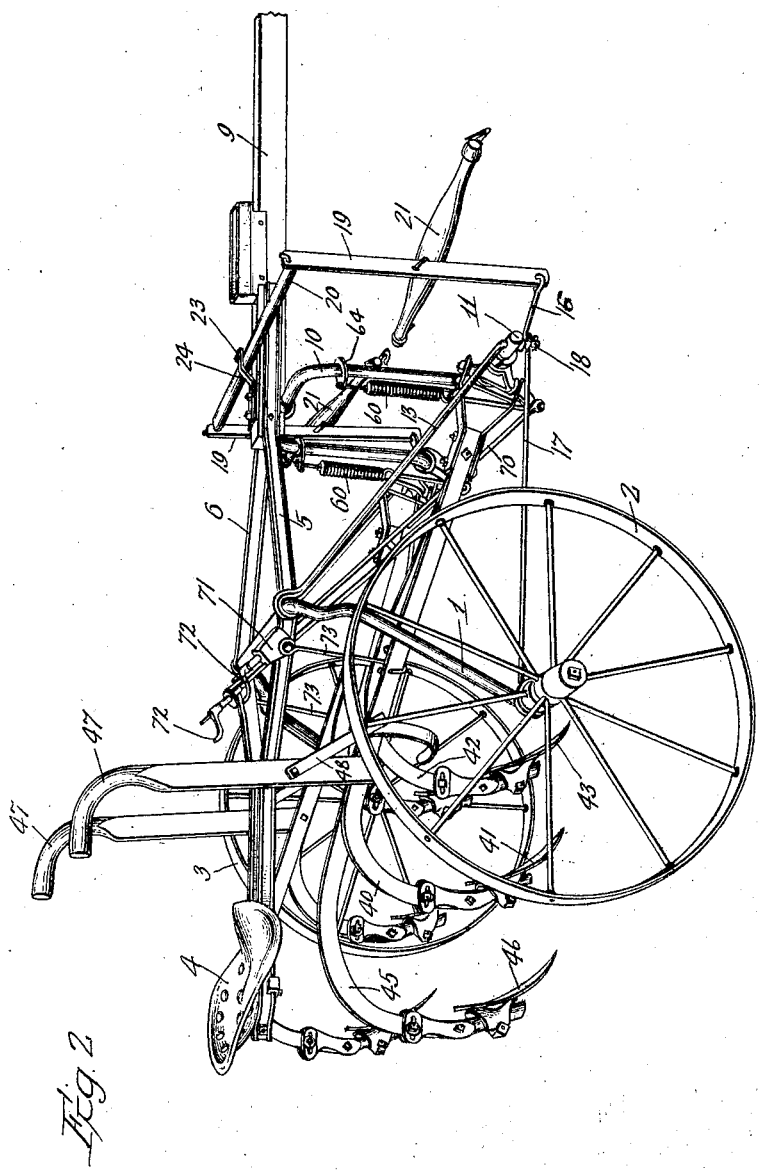
Figure 2 is a perspective view of the cultivator with the shovels in raised position.

In the construction of the cultivator, every effort has been made to eliminate parts and produce a simplified combination of elements. The importance of the construction, the location and the combination of the parts can be best explained by explaining the problems to be met and the manner in which the construction meets them.

Practically all riding cultivators of today are made with high wheels. These have been thought necessary in order that the cultivator may have a light draft and be easily steered. These high wheels are such that, when the operator is seated on the cultivator, the tops of the wheels are on the level with his face or only slightly below it. The result is that, on windy days, a great deal of dirt is blown into the face of the operator because the wheels carry the soil up where the wind can reach it and blow it on him. This is a decidedly disagreeable feature of high wheel cultivators and, in addition, the larger the diameter of the wheels, the more they cost. These disadvantages have, however, been considered necessary evils in order to get light draft and easy operation of the cultivator and the high wheel has practically become standard. The present invention departs from the standard practice and employs small diameter wheels, thus avoiding the difficulty of having dirt blown into the face of the operator and at the same time reducing the cost of the wheels. Lightness of draft and ease of operation are secured by otherwise choosing and combining the parts to produce a cultivator of such light weight that any supposed increase in draft due to low wheels is more than offset by the decrease in weight in the cultivator. Several additional advantages are secured as will hereinafter appear.

Another problem is that of balancing the weight of the operator. This may vary from a 200 pound man to a boy weighing 100 pounds or less. It also varies depending on whether the cultivator rigs are in working or transport position. When the cultivator is in working position the weight of the rigs is on the ground, but when the cultivator is being transported the major portion of the weight of the rigs is to the rear of the axis of the supporting wheels where it tends to tilt the guiding pole upwardly. The usual construction for solving both of these problems is to provide some means for shifting the axis of the wheels relative to the operator or vice versa. This requires quite a number of extra parts, it requires a special mounting of the wheels and if the wheels are also to be steered the construction becomes quite complex. In the present invention the parts are coordinated so that the weight of the operator does not have to be shifted, nor do the wheels have to be moved. The cultivator is sufficiently stable under all conditions because of its novel and simple construction to make special balancing devices unnecessary.

Still another problem is that of placing the operator properly relative to the work. He must be far enough to the rear of the shovels to watch their work and there must be sufficient room in front of him and to the sides to permit freedom of action in swinging the shovels. This introduces complications in that the position of the operator affects the balance of the cultivator. If he is placed too far to the rear, it makes it difficult to balance his weight, and if he is placed far enough in front to make the balancing problem easy, he is not in a position where he can easily view the work. The high wheels in the usual riding cultivator make it necessary to position them relatively far forward in order that the shovels may clear the rear of the wheels. This means that the operator must be placed relatively far back in a high wheel cultivator in order to view the work. In the present cultivator the low wheels permit placing the axis of the wheels further rearward than would be possible with a high wheel cultivator and thus the axis of support is nearer the weight of the operator while, at the same time, he can view the work being done by the shovels.

An important advantage that is gained by the use of low wheels in combination with the improved construction of drag bars and the coordination of parts, is the narrow spacing of the wheels which may be made permanent and yet a wide swing for the drag bars are obtained to meet varying requirements. In high wheel cultivators the wheels have to be spaced farther apart to get the same drag bar swing without interference with the rear shovels. A narrow tread is preferable.

A further problem is that of guiding the shovels. This is often done in riding cultivators by pivoting the cultivator wheels and providing a steering gear for them, or the seat may be made movable and the operator may shift his weight to steer the cultivator or the shovels. All such constructions involve connections, wheels become loose as they wear and which thus have a lag which prevents them from responding quickly to guiding movements. The present invention comprehends gaining all the advantages of the old walking cultivators while at the same time permitting the operator to ride. To this end the cultivator drag bars are provided with handles which extend upwardly where they may be easily grasped by the operator for guiding the shovels directly. Foot rests are also provided to combine direct foot operation with direct hand manipulation.

Other problems are those of attaching the cultivator drag bars to the arch and the arch to the frame so that these parts will not become loose after the cultivator has been used for some time. This is accomplished by novel and simple constructions hereinafter explained. Still another problem is that of bracing the cultivator properly by use of the fewest number of parts and this is accomplished in the present cultivator by making each part perform a maximum number of functions.

The cultivator has an arched axle, 1, on which are journaled ground wheels, 2 and 3. These wheels are of relatively small diameters and it will be noted that their tops come hardly as high as the level of the seat and they are thus sufficiently low to prevent dirt from blowing from them into the operator's face. These small diameter wheels also make it possible to get the axis of support nearer the operator and to use a narrow spacing of wheels while, at the same time, retaining a wide swing for the drag bars.

The operator's seat, 4, is supported by seat bars 5 and 6, to which it is fastened by a clamp 7. These bars diverge forwardly and they have openings through them for receiving the arch axle 1. The provision of these openings avoids the necessity for bearing brackets or other parts for mounting the seat bars on the axle. The bars converge again in front of the arch axle and are bolted by bolts 8 to the guiding pole 9.

A drag bar supporting arch 10 attached to the guiding pole, 9, has two oppositely projecting wrists, 11 and 12, on which the drag bars are pivoted. These wrists extend out beyond the drag bar connection and are provided with holes in their ends for receiving the bent ends of upper braces, 13 and 14. These braces extend rearwardly and upwardly and are provided at their rear ends with loops which encircle the arched axle 1. It will be noted that the arched axle has a slight bend, 15, in it, which positions the loops on the rear ends of the braces and, together with the seat bars 5 and 6, holds the braces in place. This avoids the necessity for connecting brackets and bolts. The bent front ends of the braces, 13 and 14, extend downwardly through the holes in the wrists 11 and 12 of the arch 10, and also through loops in the ends of the drag links 16 and the lower braces 17. Cotter pins 18 hold the bent ends of braces 13 and 14 from being displaced. The lower braces 17 extend rearwardly and are connected to the arch axle, 1, near where the ground wheels are journaled. The arched axle slopes forward to give plenty of room for easy manipulation of the shovels by the operator and it will be observed that the sides of the axle are bent upward near the wheels to also provide room and to clear the corn when it is high. The arched axle together with the braces form a rigid framework and the parts are connected together and held in place by one another without the use of separate connecting pieces.

The drag links 16 are connected to links 19 depending from the double tree 20, such depending links carrying the single trees 21. The double tree rests on a metal plate 22 on top of the guiding pole and is pivoted on a bolt 23 which extends through the plate 22 and a spaced arm 24 that is bolted to the plate 22 and the guiding pole by the same connector that holds the arch 10 in place and which is of the following novel construction.

Figures 3, 4, 5:
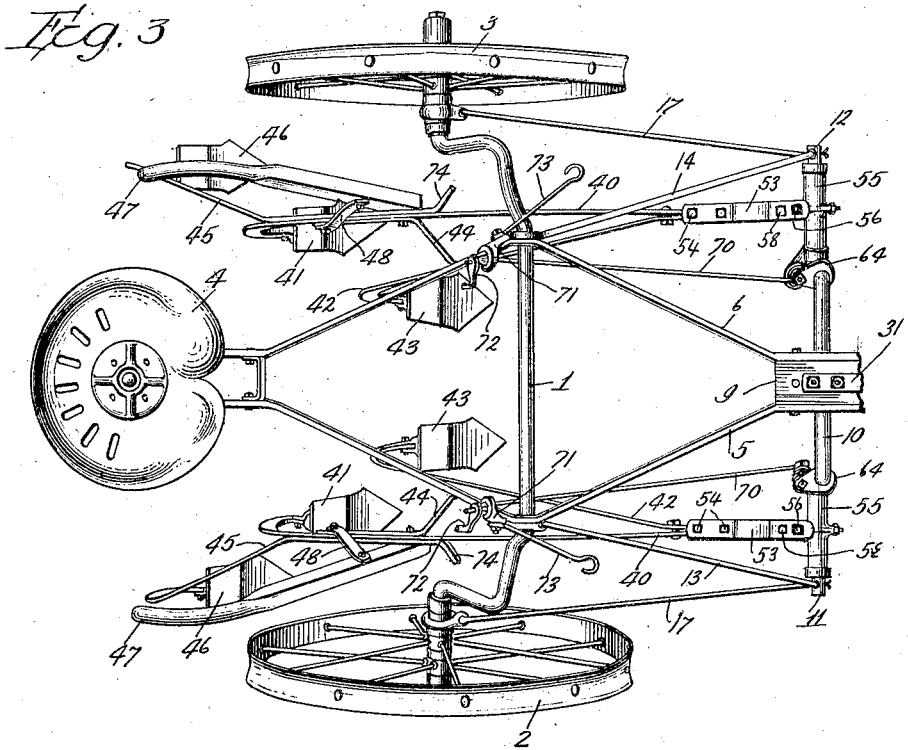
Figure 3 is a plan view of the cultivator.
Figure 4 is a bottom view of the connection of the cultivator arch to the guiding pole.
Figure 5 is a detailed cross-section of the connection of the arch to the guiding pole.

The connection of the arch to the guiding pole is best illustrated in Figs. 4 and 5. The guiding pole 9 has a semi-circular groove in its bottom surface slightly shallower and narrower than the arch and into which the arch fits. A U-bolt 30 is clamped around the arch and its arms extend upwardly through openings in the guiding pole and are drawn tight by the nuts on the ends of the arms as shown in Fig. 5. This simple connection of the arch to the guiding pole is a distinct improvement in that the arch can easily be kept tightly clamped in position and will not readily become loose after the cultivator has been used, as is ordinarily the case when the arch is fastened to the guiding pole by means of a bolt or similar fastening device which extends through the pole and wears a hole in it. Should the connection become a little loose, it can be quickly and firmly tightened by tightening the U-bolt.

The drag bars are also of novel construction and they combine with the other features of the cultivator to insure proper and efficient operation. The two drag bars are similar, except that the one is right and the other left handed, and for the sake of convenience only one will be described in detail. Lightness, simplicity, and low cost are achieved by making the drag bars out of plain flat metal strips. The main strip 40 extends rearwardly in approximately a straight line with its rear end curved downwardly to receive the shovel 41. An inside member 42 is bolted to the main member 40 near its front and diverges rearwardly and has its rear end curved downwardly to receive the shovel 43. The two members are connected together by a brace 44. Bolted to the main member 40 near its rear end is an outside member 45 carrying the shovel 46. This outside member on each drag bar is positioned so that its shovel will just clear the rear end of the adjacent wheel. Operating handles 47 are connected to the drag bars, such handles being braced to the drag bar by the braces 48. The handles extend upwardly to a position where they may be conveniently manipulated by an operator seated in the operator's seat. The drag bars are relatively short, but they nevertheless position the shovels sufficiently to the rear to permit them to have freedom of movement without interference from the wheels 2 and 3. Also the shovels are in a position such that the work can be readily viewed by the operator and their weight is distributed relative to the axis of the wheels so that whether they are raised or lowered makes little difference in the balance of the cultivator and does not require any special balancing adjustments.

An important advantage of the drag bar construction together with the coordination of the other parts is that changes do not need to be made in the spacing of wheels. Ordinarily riding cultivators have provision for changing the spacing of the wheels because when it is desired to have the drag bars swing out far to the side the wheels will interfere unless they are moved out. In the present cultivator, the construction of the drag bars and the low wheels give such a wide range for the drag bars that no wheel spacing adjustment is necessary.

The drag bars are connected at their front ends to the supporting arch 10 by a novel connection employing a minimum number of parts as follows, reference being had particularly to Figures 6, 7, 8 and 9. The front ends of the bars 40 and 42 of each drag bar are clamped together by a bolt 50 (Fig. 9) which passes through both of them and through a spacing block 51. The pivotal connecting means includes a lower member 52 and an upper member 53, the rearward ends of both of which are arch shaped as shown in Fig. 7. These arch-shaped ends are clamped onto the edges of the drag bar members 40 and 42 by means of the bolts 54 which pass down on opposite sides of the spacing block 51, as illustrated in Figs. 6 and 9. This provides a rigid connection which prevents the drag bar members from pulling away from the connecting piece and at the same time it provides a connection that is or can be always kept tight. Ordinarily the connection is by means of bolts which become loose when worn and the parts then rattle and wabble about. With the present construction the parts will not ordinarily become loose, but if there should be wear on some of them, the connection can be easily tightened by simply tightening the bolts 50 and 54. The connection employs the fewest number of parts possible and no extra connecting pieces are necessary since the members 52 and 53 of the pivotal connection are employed.

Each pivotal connection for the drag bars includes, in addition to the members 52 and 53, a hub or sleeve 55 which is journaled on the wrists 11 and 12 respectively of the arch 10. The members 52 and 53 are pivoted to the sleeve 55 to turn about a substantially vertical axis. This gives the drag bar a lateral swinging movement as well as a vertical swinging movement. The pivotal connection of the members 52 and 53 to the sleeve 55 is especially constructed to prevent it becoming loose while in use and to permit it to be easily tightened. Each of the members 52 and 53 has a square opening in its outer end (Fig. 10) which fits over the squared end of conical nuts 56 and 57 fitting over tapered pins on the sleeve 55. A bolt 58 extends between the two members 52 and 53. By tightening this bolt the conical nuts may be forced onto the tapered pins on the sleeve 55 to tighten the pivotal connections in the event that the pivots should become slightly worn. The sleeves 55 are prevented from sliding off the wrists by the braces 13 and 14 which extend through openings in the outer ends of the wrists.

The drag bars are counterbalanced by means of springs 60 connected to links 61 which have bent outer ends extending through openings in arms 62 on the sleeves 55. It will be noted that when the drag bars are in lowered position as shown in Fig. 6, the arms 62 are almost in line with the springs 60 and the springs exert a small upward pull on the drag bars but, as the drag bars are raised, the arms 62 move to a position to give the springs more leverage so that they exert an increasingly effective force for assisting in raising the drag bars. The upper ends of these springs are connected to the arch 10 by novel and simple connections as follows:

The upper end of each spring is connected to a bolt or link 63 which is fastened to one end of a clip 64 which has an opening in its other end which permits the clip to slide up and down on the vertical portion of the arch 10. The opening in the clip 64 is only slightly greater than the cross-section of the arch so that the clip can be moved up and down when it is in a position at right angles to the vertical portion of the arch. The tension of the spring 60 tends to bias the clip to an angular position and cause it to grip the arch. The clip may be readily adjusted by taking hold of its outer end and pulling against the tension of the spring until the clip reaches a right angular position in which position it may be slipped up and down on the arch to the desired adjusted position. The spring 60 may then be released and it will automatically move the clip to an angular position and cause it to bite into the arch and remain where it was adjusted. If desired, a small pin 65 may be employed to absolutely insure against the clip slipping downward and to insure that it will bite the arch and hold at the desired position. The tension of the spring may be adjusted by varying the position of the clip or by adjusting the bolt that connects the spring to the clip.

The working depth of the shovels is regulated by means of links 70 which are connected at their lower ends to the same arms 62 on the sleeve 55 as the springs 63. In the construction shown, the lower ends of the links are looped and the bent ends of the links 61 are extended through the loops. This provides a simple connection and avoids the use of connecting pieces. The upper ends of the links 70 pass through angular metal plates 71 fastened to the seat bars 5 and 6. The upper ends of the links are screw threaded and adjustable finger pieces 72 are provided for adjusting or limiting the movement of the links. It will be understood that these links limit the movement of the arm 62 in a counter clockwise direction as viewed in Fig. 1 and thus limit the depth to which the shovels may move.

It will be noted that the arched axle 1 is sloped forwardly and that it is rigidly held in this position by the connection to the seat bars and the braces on the cultivator. It is thus forward where it will not interfere with the raising of the rigs or the operation of the cultivator and it permits the shovels and other parts to be located farther forward than would ordinarily be the case. The weight of the operator is brought so nearly over the axis of the wheels that variations in his weight make little difference in the balancing of the cultivator. No special balancing adjustments are necessary.

The drag bars are held in transport position by hooks 73 depending from the seat bars and engaging the drag bars or by the angular members 74 which are positioned so that the drag bars may be raised, moved to one side and lowered slightly to engage these members on the sloping sides of the arched axle 1.

The connection of the shovels to the drag bars has also been simplified and the cost reduced. The flat metal bars of the drag bars are simply bent to proper shape and cut off. There is no special forming of their ends to shape them to receive the shovel fittings. A fitting 75 is provided having a round end 76 on which the shovel may be adjusted up and down. The fitting is bolted to the bar at the point 77 and its upper end has a slot for receiving a bolt 78 for connecting the upper end of the fitting to the bar. The slot permits the fitting to be adjusted to vary the working angle of the shovel and it also forms a releasable connection permitting the shovel to tilt backwardly if an unusually hard obstacle is encountered. The point at which the fitting will release can be regulated by tightening or loosening the bolt 78. If the point of the shovel should strike an obstacle that will not yield, the fitting will turn on the bolt 77 as a pivot and the upper end will move relative to bolt 78 until the end of the slot is reached. This movement is sufficient to move the shovel to a position to permit it to ride over the obstacle.

From the explanation given it will be clear that a simplified construction has been produced in which the parts are constructed and coordinated to function together to obtain a maximum in results. The cultivator is light and hence easily pulled. Inexpensive materials are used in its construction which, together with the small number of parts employed as well as their simple construction, makes the cost of the cultivator low and achieves a distinct economic advancement. The cultivator is permanently balanced, the operator may see the work, he may easily and quickly manipulate the shovels, no complicated series of levers or adjustments are necessary, the parts will not become loose, there is plenty of clearance for corn, plenty of room to manipulate the shovels which enables the cultivator to be used under varying conditions with a permanent spacing of wheels.

No claim is made in this case to the means for supporting the drag bars in transport position, such subject matter being claimed in my Patent No. 1,607,646, of which the present application is a division.

It is to be understood that the construction shown is for purposes of illustration and that variations may be made in it without departing from the spirit and scope of the invention as defined by the claims.

I claim:

1. The combination in a cultivator of an arched axle, a pair of ground wheels journaled thereon, and a pair of seat supporting bars connected together at their rear ends and diverging forwardly to where they are provided with openings to receive said arched axle, said bars then converging forwardly and being connected to a guiding pole, the top portion of said arched axle having offset bends preventing lateral movement of the seat supporting bar on the axle.

2. The combination in a cultivator of an arched axle, a pair of ground wheels journaled thereon, a pair of seat supporting bars supporting an operator's seat at their rear ends and being connected to a guiding pole at their forward end, said seat supporting bars being supported by the arched axle, a drag bar supporting arch connected to said guiding pole, a pair of lower braces extending between said arch and said arched axle, and a pair of upper braces connected to said drag bar arch and extending upwardly and rearwardly where they are provided with loops surrounding said arched axle, said arched axle having a bent portion to position said loops.

3. The combination in a cultivator of an arched axle, a pair of ground wheels journaled thereon, a pair of seat supporting bars carried by said axle and spaced apart, a guiding pole connected to said seat bars, a drag bar supporting arch rigidly connected to said guiding pole, a pair of upper braces connected to the outer ends of said arch and extending upwardly and rearwardly, said braces having looped ends surrounding said axle, and said arched axle having bends therein between which and the seat bars the loops on said braces are positioned.

4. The combination in a cultivator of an arched axle, a pair of ground wheels journaled thereon, a pair of seat supporting bars having openings therein through which said axle extends, a guiding pole rigidly connected to the forward ends of said seat bars, a drag bar supporting arch rigidly connected to said guiding pole, a pair of upper braces having bent ends extending through openings in the outer ends of said drag bar supporting arch, said braces extending upwardly and rearwardly and being provided with loops on their rear ends surrounding said axle and positioned between said seat bars and bends in said axle, and lower braces connected to said arched axle near the portions on which the ground wheels are journaled, the forward ends of said lower braces having loops surrounding the ends of the upper braces which project through the openings in the drag bar supporting arch.

In testimony whereof, I affix my signature.

JOHN P. SEAHOLM.